(12) United States Patent
Bencher et al.

(10) Patent No.: US 9,646,642 B2
(45) Date of Patent: May 9, 2017

(54) RESIST FORTIFICATION FOR MAGNETIC MEDIA PATTERNING

(71) Applicant: Applied Materials, Inc., Santa Clara, CA (US)

(72) Inventors: Christopher Dennis Bencher, Cupertino, CA (US); Roman Gouk, San Jose, CA (US); Steven Verhaverbeke, San Francisco, CA (US); Li-Qun Xia, Cupertino, CA (US); Yong-Won Lee, San Jose, CA (US); Matthew D. Scotney-Castle, Morgan Hill, CA (US); Martin A. Hilkene, Gilroy, CA (US); Peter I. Porshnev, Poway, CA (US)

(73) Assignee: Applied Materials, Inc., Santa Clara, CA (US)

( * ) Notice: Subject to any disclaimer, the term of this patent is extended or adjusted under 35 U.S.C. 154(b) by 437 days.

(21) Appl. No.: 14/170,009

(22) Filed: Jan. 31, 2014

(65) Prior Publication Data

US 2014/0147700 A1 May 29, 2014

Related U.S. Application Data

(62) Division of application No. 13/193,539, filed on Jul. 28, 2011, now Pat. No. 8,658,242.

(Continued)

(51) Int. Cl.
*G11B 5/66* (2006.01)
*G11B 5/74* (2006.01)
(Continued)

(52) U.S. Cl.
CPC ............... *G11B 5/743* (2013.01); *G11B 5/85* (2013.01); *G11B 5/855* (2013.01)

(58) Field of Classification Search
CPC ............ G11B 5/743; G11B 5/746; G11B 5/85; G11B 5/855; G11C 11/14; G11C 19/0833
See application file for complete search history.

(56) References Cited

U.S. PATENT DOCUMENTS

| 5,707,487 A | 1/1998 | Hori et al. |
| 6,391,430 B1 * | 5/2002 | Fullerton ............... B82Y 10/00 428/212 |

(Continued)

FOREIGN PATENT DOCUMENTS

| JP | 2008135092 A | 6/2008 |
| WO | 2010074078 A | 7/2010 |

OTHER PUBLICATIONS

Chinese Office Action in related application CN 201180041059.X dated Oct. 21, 2015.

(Continued)

*Primary Examiner* — Holly Rickman
(74) *Attorney, Agent, or Firm* — Patterson + Sheridan, LLP (57) ABSTRACT

A method and apparatus for forming magnetic media substrates is provided. A patterned resist layer is formed on a substrate having a magnetically susceptible layer. A conformal protective layer is formed over the patterned resist layer to prevent degradation of the pattern during subsequent processing. The substrate is subjected to an energy treatment wherein energetic species penetrate portions of the patterned resist and conformal protective layer according to the pattern formed in the patterned resist, impacting the magnetically susceptible layer and modifying a magnetic property thereof. The patterned resist and conformal protective layers are then removed, leaving a magnetic substrate having a pattern of magnetic properties with a topography that is substantially unchanged.

9 Claims, 4 Drawing Sheets

Related U.S. Application Data (60) Provisional application No. 61/368,538, filed on Jul. 28, 2010.

(51) Int. Cl.
  *G11B 5/855* (2006.01)
  *G11B 5/85* (2006.01)

(56) References Cited

U.S. PATENT DOCUMENTS

| | | | |
|---|---|---|---|
| 6,692,901 B2 | 2/2004 | Kamijima | |
| 6,777,112 B1* | 8/2004 | Girt | G11B 5/66 |
| | | | 428/212 |
| 8,048,323 B2* | 11/2011 | Fukushima | C23C 14/0005 |
| | | | 216/22 |
| 8,551,578 B2* | 10/2013 | Nalamasu | B82Y 10/00 |
| | | | 427/130 |
| 2003/0017420 A1 | 1/2003 | Mahorowala | |
| 2004/0048490 A1 | 3/2004 | Tsuji et al. | |
| 2006/0166106 A1 | 7/2006 | Chandrachood et al. | |
| 2008/0171234 A1* | 7/2008 | Imamura | G11B 5/725 |
| | | | 428/827 |
| 2009/0087977 A1 | 4/2009 | Spuller et al. | |
| 2009/0162553 A1 | 6/2009 | Romano et al. | |
| 2009/0201722 A1 | 8/2009 | Giridhar et al. | |
| 2009/0269682 A1 | 10/2009 | Nishimura | |
| 2010/0055621 A1 | 3/2010 | Hatakeyama et al. | |
| 2010/0128378 A1 | 5/2010 | Fukushima et al. | |
| 2010/0221583 A1 | 9/2010 | Foad et al. | |
| 2010/0255218 A1 | 10/2010 | Oka et al. | |
| 2011/0122526 A1 | 5/2011 | Sato et al. | |

OTHER PUBLICATIONS

Office Action for Chinese Application No. CN 201180041059.X dated Aug. 29, 2016.

* cited by examiner

RESIST FORTIFICATION FOR MAGNETIC MEDIA PATTERNING

CROSS-REFERENCE TO RELATED APPLICATIONS

This application is a divisional of U.S. patent application Ser. No. 13/193,539, filed Jul. 28, 2011 which claims benefit of U.S. Provisional Patent Application Ser. No. 61/368,538, filed Jul. 28, 2010, which is herein incorporated by reference.

FIELD

Embodiments described herein relate to methods of manufacturing magnetic media. More specifically, embodiments described herein relate to patterning of magnetic media by plasma exposure.

BACKGROUND

Magnetic media are used in various electronic devices such as hard disk drives and magnetoresistive random access memory (MRAM) devices. Hard-disk drives are the storage medium of choice for computers and related devices. They are found in most desktop and laptop computers, and may also be found in a number of consumer electronic devices, such as media recorders and players, and instruments for collecting and recording data. Hard-disk drives are also deployed in arrays for network storage. MRAM devices are used in various non-volatile memory devices, such as flash drives and dynamic random access memory (DRAM) devices.

Magnetic media devices store and retrieve information using magnetic fields. The disk in a hard-disk drive is configured with magnetic domains that are separately addressable by a magnetic head. The magnetic head moves into proximity with a magnetic domain and alters the magnetic properties of the domain to record information. To recover the recorded information, the magnetic head moves into proximity with the domain and detects the magnetic properties of the domain. The magnetic properties of the domain are generally interpreted as corresponding to one of two possible states, the "0" state and the "1" state. In this way, digital information may be recorded on the magnetic medium and recovered thereafter.

Magnetic storage media typically comprise a non-magnetic glass, composite glass/ceramic, or metal substrate with a magnetically susceptible material between about 100 nm and about 1 µm thick deposited thereon by a deposition process, commonly a PVD or CVD process. In one process, a layer comprising cobalt and platinum is sputter deposited on a structural substrate to form a magnetically active layer. The magnetically susceptible layer is generally either deposited to form a pattern, or is patterned after deposition, such that the surface of the device has areas of magnetic susceptibility interspersed with areas of magnetic inactivity denominated by orientation of their quantum spin. Where domains with different spin orientations meet, there is a region referred to as a Bloch wall in which the spin orientation goes through a transition from the first orientation to the second. The width of this transition region limits the areal density of information storage because the Bloch wall occupies an increasing portion of the total magnetic domain.

To overcome the limit due to Bloch wall width in continuous magnetic thin films, the domains can be physically separated by a non-magnetic region (which can be narrower than the width of a Bloch wall in a continuous magnetic thin film). Conventional approaches to creating discrete magnetic and non-magnetic areas on a medium have focused on forming single bit magnetic domains that are completely separate from each other, either by depositing the magnetic domains as separate islands or by removing material from a continuous magnetic film to physically separate the magnetic domains. A patterned mask may be applied to a non-magnetic substrate, and a magnetic material deposited over exposed portions of the non-magnetic substrate, or the magnetic material may be deposited before masking and patterning, and then etched away in exposed portions. By one method, the non-magnetic substrate is topographically patterned by etching or scribing, and the magnetically susceptible material deposited by spin-coating or electroplating. The disk is then polished or planarized to expose the non-magnetic boundaries around the magnetic domains. In some cases, the magnetic material is deposited in a patterned way to form magnetic grains or dots separated by a non-magnetic area.

Such methods are expected to yield storage structures capable of supporting data density up to about 1 $TB/in^2$, with individual domains having dimensions as small as 20 nm. All such methods typically result in significant surface roughness of the medium. Altering the topography of the substrate can become limiting because the read-write head of a typical hard-disk drive may fly as close as 2 nm from the surface of the disk. Thus, there is a need for a process or method of patterning magnetic media that has high resolution and does not alter the topography of the media, and an apparatus for performing the process or method efficiently for high volume manufacturing.

SUMMARY

Embodiments described herein provide a method of forming a patterned magnetic substrate by forming a patterned resist having thick portions and thin portions on a magnetically active surface of a substrate, forming a stabilizing layer over the patterned resist, exposing portions of the magnetically active surface to directed energy through the stabilizing layer and the thin portions of the patterned resist, and modifying a magnetic property of the exposed portions of the magnetically active surface to form the patterned magnetic substrate.

Other embodiments provide a method of forming a patterned magnetic substrate by forming a magnetically active layer on a structural substrate, forming a pattern transfer layer on the magnetically active layer, patterning the pattern transfer layer by a physical patterning process, forming a conformal protective layer over the pattern transfer layer, and modifying the magnetic properties of the magnetically active layer according to the pattern formed in the pattern transfer layer by exposing the substrate to energy selected to penetrate portions of the pattern transfer layer.

Other embodiments include a substrate having a magnetically susceptible layer, the magnetically susceptible layer having a first plurality of domains having a magnetic property with a first value, a second plurality of domains having a second value of the magnetic property, and a transition region between the first plurality of domains and the second plurality of domains, the transition region having a dimension less than about 2 nm, wherein each of the first plurality of domains and the second plurality of domains has a dimension less than about 25 nm.

Other embodiments include a magnetic media substrate made by forming a magnetically active layer on a structural substrate, forming a patterned resist having thick portions and thin portions in contact with the magnetically active layer, forming a conformal stabilizing layer over the patterned resist, exposing portions of the magnetically active surface to directed energy through the stabilizing layer and the thin portions of the patterned resist, modifying a magnetic property of the exposed portions of the magnetically active surface to form a patterned magnetic substrate, and removing the patterned resist and the stabilizing layer.

Other embodiments provide an apparatus for processing a substrate, the apparatus having a substrate handing portion coupled to a substrate processing portion by one or more load-lock chambers, the substrate processing portion comprising a PEALD chamber and one or more plasma immersion chambers coupled to a transfer chamber, and the substrate handling portion comprising a loading portion, a transfer portion, and an interface portion.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally provide methods and apparatus for forming a patterned magnetic substrate that may be used for any purpose to which such substrates may be directed, including magnetic storage. Some embodiments form substrates for hard disk drives, while other embodiments may form static storage devices such as MRAM devices.

Figure 1:
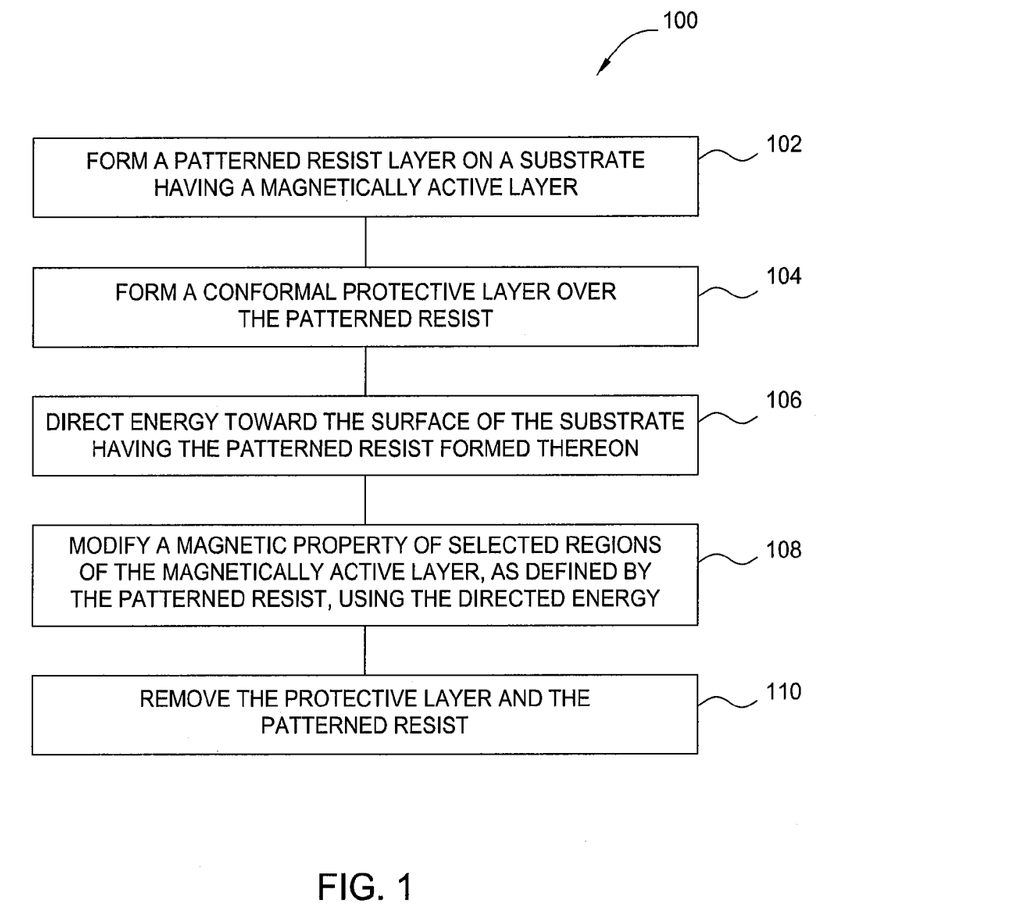
FIG. 1 is a flow diagram summarizing a method according to one embodiment.

FIG. 1 is a flow diagram summarizing a method 100 according to one embodiment. The method 100 of FIG. 1 is used to form a substrate having a pattern of magnetic properties defined according to a pattern formed in a resist layer applied to the substrate and then subsequently removed. The pattern of magnetic properties results in a substrate with magnetic domains having a dimension less than about 25 nm with very smooth topography.

In FIG. 1, a patterned magnetic substrate is produced by forming a patterned resist layer on a substrate having a magnetically active layer, at 102. The substrate is a structural substrate having mechanical strength to support the overlying layers. Substrates used are generally metal, glass, or a carbon material such as a polymer or composite, and may be metal alloys or composite glass substances such as glass/ceramic blends. The substrate is generally magnetically impermeable with diamagnetic, or only very weak paramagnetic, properties. For example, in some embodiments, the magnetic susceptibility of the base layer is below about $10^{-4}$ (the magnetic susceptibility of aluminum is about $1.2 \times 10^{-5}$).

The substrates are generally coated with a magnetically susceptible material that provides a medium for magnetic patterning. The magnetically susceptible material may be formed in multiple layers, each layer having the same or different composition. In one embodiment, a first layer of soft magnetic material having weak magnetic properties, such as coercivity or susceptibility, is formed over the base substrate, and a second layer of hard magnetic material having stronger magnetic properties is formed over the first layer. In some embodiments, each layer comprises one or more elements selected from the group consisting of cobalt, platinum, nickel, molybdenum, chromium, tantalum, iron, terbium, and gadolinium. In one embodiment, the magnetically susceptible layer comprises a first layer of iron or iron/nickel alloy having a thickness between about 100 nm and about 1,000 nm (1 μm) and a second layer comprising two sub-layers, each having a thickness between about 30 nm and about 70 nm, such as about 50 nm, and each comprising chromium, cobalt, and platinum. These layers may be formed by any suitable method known to the art, such as physical vapor deposition, or sputtering, chemical vapor deposition, plasma-enhanced chemical vapor deposition, spin-coating, plating by electrochemical or electroless means, and the like.

The patterned resist layer is formed by applying a resist material to the substrate and patterning the resist layer by a physical or lithographic patterning process capable of producing features having a dimension of about 50 nm or less in some embodiments, 25 nm or less in some embodiments, and 10 nm or less in some embodiments. The resist material is a material that can be readily removed without affecting the underlying magnetically susceptible material, or a material that may be left in the finished device without adversely affecting its properties. For example, in many embodiments, the resist material is soluble in a solvent liquid, such as water or hydrocarbon. In some embodiments, the resist material is applied to the substrate as a curable liquid, patterned by physical imprint with a template, and cured by heating or UV exposure. In other embodiments, the resist material is applied to the template and at least partially cured before applying the coated template to the substrate to transfer the resist material to the substrate. The resist material is generally also resistant to degradation by incident energy or energetic ions. In some embodiments, the resist material is a curable material, such as an epoxy or thermoplastic polymer, that will flow prior to being cured and will provide some resistance to energetic processes after curing.

The template is generally formed from a durable material that will retain its shape through multiple cycles of imprinting a mask material. In some embodiments, the template comprises aluminum. Features formed on the template may have a dimension less than about 50 nm, such as less than about 25 nm, or even less than about 10 nm. In some embodiments, features having dimension between about 1 nm and about 10 nm may be formed in the template. The very small dimension features may be formed using any process suitable for forming such small features in a substrate. One example of such a process is electron beam writing. Ion beam or molecular beam writing may be used in some other embodiments.

The patterned resist material defines masked and unmasked portions of the magnetically susceptible layer. The pattern formed in the resist material generally results in portions of the magnetically susceptible layer covered by a thin layer of resist material, or no resist material, and other portions covered by a thick layer of resist material. The portions covered by a thin layer, or no layer, of resist correspond to the unmasked portions, and may be subsequently treated by exposure to a processing environment selected to penetrate the thin resist layer without penetrating the thick resist layer. In some embodiments, the thick resist layer may have a thickness between about 50 nm and about 150 nm, such as between about 60 nm and about 100 nm, for example about 80 nm. In some embodiments, the thin resist layer may have a thickness between about 0 nm and about 20 nm, such as between about 2 nm and about 10 nm, for example about 5 nm.

A suitable resist material for practicing embodiments described herein is the Monomat resist available from Molecular Imprints, Inc., of Austin, Tex. The Monomat resist may be used in an imprinting process as described above implemented using one of the J-FIL™ imprinters, also available from Molecular Imprints, Inc.

In other embodiments, the resist material may be a photoresist material such as the Advanced Patterning Film amorphous carbon resist material applied using a CVD process implemented on the PRODUCER® CVD system available from Applied Materials, Inc., of Santa Clara, Calif.

At 104, a protective layer is formed over the patterned resist. The protective layer reduces or prevents damage to the resist layer, and resulting pattern degradation, during subsequent processing. The protective layer is generally applied in a conformal manner to preserve the pattern of thick and thin coverage regions that defines the areas to be treated and the areas to be protected during treatment.

The protective layer, which may be a stabilization layer to stabilize the patterned resist during processing, is a silicon containing layer in some embodiments. In one aspect, the layer may protect the thick coverage regions of the patterned resist from excessive bombardment by energetic species during processing. The energetic species will change the shape and/or thickness of the thick coverage regions, changing or reducing the degree of protection afforded to the portions of the magnetically susceptible layer below the thick coverage regions, which may in turn degrade the pattern. In another aspect, the layer may stabilize the patterned resist during processing by providing a relatively hard boundary to contain the patterned resist layer during processing, preventing migration of resist material from the thick coverage regions to the thin coverage regions, which would also degrade the pattern.

The layer generally comprises silicon, and may comprise one or more elements from the group consisting of oxygen, nitrogen, carbon, or any mixture thereof. The layer may comprise silicon oxide, silicon carbide, silicon nitride, silicon oxycarbide, silicon oxynitride, or SiOCN. The layer may also contain hydrogen in some embodiments. In other embodiments, the protective layer may be a doped silicon layer or a doped carbon layer. For example, a silicon layer doped with carbon, oxygen, nitrogen, or a combination thereof, may be used, or a carbon layer doped with silicon may be used.

The protective layer is generally very thin. The patterned resist features openings having a dimension that defines the pattern pitch. In a pattern having a standard feature size, the pattern pitch is the standard feature size. The layer is usually deposited to a thickness that is less than ¼ the pattern pitch to preserve the openings defined by the pattern. In a pattern having different feature sizes, the layer will be deposited to a thickness that is less than ¼ the smallest feature size. In some embodiments, the layer has a thickness that is less than about 10 nm, such as between about 2 nm and about 5 nm or less than about 2 nm, for example about 1 nm or about 3 nm.

A conformal protective layer may be formed using any process adapted to deposit thin conformal films, such as conformal CVD, cyclical CVD, pulsed CVD, or ALD. In-situ plasma is typically not used, but remote plasma may be used in some embodiments. A low temperature process is preferred to avoid thermal damage to the patterned resist layer or the magnetically susceptible layer. The conformal protective layer is generally formed at a temperature less than about 150° C., such as between about 20° C. and about 100° C., or between about 30° C. and about 80° C., for example about 50° C. In alternate embodiments, the layer may be formed at an ambient temperature, for example between about 10° C. and about 30° C., such as room temperature. A conformal protective layer may be formed using a PRODUCER CVD or ALD chamber, or using a P3I™ chamber, also available from Applied Materials, Inc.

Suitable precursors are those that may be maintained in the vapor phase at the temperatures described above and at the low pressures characteristics of vapor deposition processes. Silicon containing precursors and oxygen or nitrogen containing precursors are used to form the conformal layer. Ozone is used as the oxygen containing precursor in many embodiments. Ozone may be activated by heating, either remotely or in the chamber by contact with heated chamber surfaces, such as chamber walls or gas distribution plenums. Additionally, suitable precursors are susceptible to being activated using a remote plasma generator operating at power levels between about 50 W and about 3,000 W. At least one silicon precursor is used to react with oxygen or nitrogen containing species to deposit the protective layer. The silicon precursor may also be a carbon source in some embodiments. In other embodiments, a separate carbon source may be provided. Suitable silicon source compounds for low temperature deposition of the type described above include bis-diethylamino silane. Chamber pressure is typically maintained between about 2 Torr and about 100 Torr, and may be adjusted to control conformality of the deposited layer.

In one exemplary atomic layer deposition process for forming a conformal protective layer, half-reactions are performed to deposit half-layers, as is known in the ALD art. A silicon containing precursor is provided to a chamber containing the substrate to be processed to form a silicon containing half-layer, and then an oxygen containing precursor is provided to complete the layer. The substrate has a magnetically susceptible layer, and a patterned resist layer formed on the magnetically susceptible layer, as described above. The silicon-containing precursor is a compound or gas mixture that may be maintained as a vapor at the processing temperatures used for the deposition process.

For a CVD process using active oxygen species, the silicon containing precursor may be selected from the group consisting of octamethylcyclotetrasiloxane (OMCTS), methyldiethoxysilane (MDEOS), bis(tertiary-butylamino) silane (BTBAS), bis(diethylamino)silane (BDEAS), tris(dimethylamino)silane (TDMAS), bis(dimethylamino)silane (BDMAS), bis(ethylmethylamino)silane (BEMAS), tetramethyl orthosilicate (TMOS) timethylsilane (TMS) tetraethyl orthosilicate (TEOS), and combinations thereof. In one CVD embodiment, BDEAS is a preferred silicon-containing precursor. Gases that are optionally introduced into the chamber at the same time as the silicon-containing precursor include carrier gases, such as helium, nitrogen, oxygen, nitrous oxide, and argon. Ozone mixed with oxygen or active oxygen and/or nitrogen radicals generated by a remote plasma source are the preferred reactive gases. A remote plasma may be formed by providing oxygen and/or nitrogen gas to a remote plasma generator and coupling RF power between about 50 W and about 3,000 W, at a frequency of 13.56 MHz and/or 350 KHz, into the generator.

For an ALD process using active oxygen or nitrogen species, the silicon containing precursor may be selected from the group consisting of dichlorosilane (DCS), trichlorosilane (TCS), silicon tetrachloride, dibromosilane, silicon tetrabromide, BDEAS, OMCTS, trisilamine (TSA), silane, disilane, and combinations thereof.

The silicon containing precursor may be introduced into the chamber at a flow rate of between about 5 sccm and about 1000 sccm. An optional carrier gas, e.g., helium, may be introduced into the chamber at a flow rate of between about 100 sccm and about 20000 sccm. The ratio of the flow rate of the silicon containing precursor, e.g., BDEAS, to the flow rate of the carrier gas, e.g., helium, into the chamber is about 1:1 or greater, such as between about 1:1 and about 1:100. The chamber pressure may be greater than about 5 mTorr, such as between about 1.8 Torr and about 100 Torr, and the temperature of a substrate support in the chamber may be between about 10° C. and about 100° C. while the silicon-containing precursor is flowed into the chamber to deposit the layer. More particularly, the temperature is between about 30° C. and about 80° C. The silicon-containing precursor may be flowed into the chamber for a period of time sufficient to deposit a layer having a thickness of between about 5 Å and about 200 Å. For example, the silicon-containing precursor may be flowed into the chamber for between about 0.1 seconds and about 60 seconds.

The silicon containing precursor deposits a silicon containing half-layer conformally on the substrate, covering the patterned resist in the masked areas and the unmasked areas, including vertical and horizontal surfaces of the patterned resist layer. If the unmasked areas are free of resist material, for example if the magnetically susceptible layer is exposed in the unmasked areas, the silicon containing half-layer covers the magnetically susceptible layer in the unmasked areas. The silicon containing half-layer may be a monolayer or an atomic layer of silicon or silicon species.

A reactive oxygen containing gas, such as ozone, an ozone/oxygen mixture, oxygen radicals, and the like, is introduced into the chamber and reacts with the silicon containing half-layer to produce a conformal silicon oxide layer. In one embodiment, a gas mixture of between about 0.5% and about 10% by volume of ozone in oxygen is introduced into the chamber at a flow rate of between about 100 sccm and about 20000 sccm. The ozone/oxygen mixture may be activated by contacting with a chamber surface, such as a chamber wall, gas distributor or showerhead, controlled at a temperature between about 70° C. and about 300° C., for example between about 100° C. and about 180° C. The chamber pressure may be between about 5 mTorr and about 100 Torr, and the temperature of a substrate support in the chamber may be between about 10° C. and about 100° C., for example between about 30° C. and about 80° C. while the ozone/oxygen gas is flowed into the chamber.

In an ALD embodiment, the silicon precursor is provided to the chamber and allowed to deposit on the surface of the substrate until all deposition sites are consumed. Then an active oxygen or nitrogen species is provided to the chamber to react with the silicon precursor deposited on the substrate surface to form a conformal silicon oxide layer. The thickness of the conformal silicon oxide layer is determined, and if a higher thickness is desired, the process of exposure to the silicon containing precursor and the oxygen containing gas may be repeated until a target thickness is reached. The chamber is purged with a purge gas, substantially removing all oxygen containing species from the chamber, and the layer formation cycle repeated if desired. The conformal silicon oxide layer serves as a protective layer, which may have a thickness between about 10 Å and about 200 Å, such as between about 20 Å and about 50 Å. A thin conformal protective layer provides resistance against damage during subsequent processing while preserving the pattern formed in the resist layer.

Nitrogen and carbon precursors may also be used in a cyclical deposition process similar to that described above. Nitrogen source compounds such as ammonia ($NH_3$) or amines ($R_xH_yN$, x>0, x+y=3), hydrazine ($H_2N_2$), substituted hydrazines ($R_xH_yN_2$, x>0, x+y=2), or diamines ($R[NH_xR'_y]_2$, x+y=3), hydrazoic acid ($HN_3$) or azides ($RN_3$), and aminosilanes ($SiH_xR_y[NH_aR'_b]_z$, x+y+z=4, a+b=3) may be used to provide nitrogen. Lower hydrocarbons such as methane ($CH_4$), ethane ($C_2H_6$), propane ($C_3H_8$), ethylene ($C_2H_4$), propylene ($C_3H_6$), and acetylene ($C_2H_2$) may serve as carbon sources. In addition, various organosilicon compounds, for example alkylsilanes and disilanes, may serve as carbon sources.

In some embodiments, dopants such as carbon and nitrogen may be used to control the density of the conformal protective layer, which, along with thickness of the layer, controls the extent of energetic species impacting the patterned resist layer during subsequent processing. A carbon source may be included with the process gas mixture for depositing the conformal protective layer to introduce carbon into the layer. In some embodiments, the conformal protective layer may be subjected to a post-processing step to remove dopants such as carbon from the layer.

In some embodiments, adhesion of the conformal protective layer to the patterned resist layer during plasma processing may also be enhanced by forming a transition layer comprising silicon and carbon between the patterned resist layer and the conformal protective layer. A carbon source may be added to the process gas mixture for a first duration, during which a silicon and carbon containing layer is deposited, and then the carbon source may be discontinued for a second duration to form a carbon-free layer. The silicon and carbon containing layer may improve adhesion to the carbon containing resist layer by material similarity.

The foregoing operations form a patterned resist layer over the magnetically susceptible layer, and a conformal protective layer over the patterned resist layer. The patterned resist and protective layer have thick areas and thin areas that define regions of the magnetically susceptible layer to be treated with energy. Regions of the magnetically susceptible layer adjacent to thin areas of the resist and protective layers are treated with energy to change a magnetic property of the magnetically susceptible layer in those regions.

At 106, energy is directed toward the surface of the substrate to modify a magnetic property of the magnetically susceptible layer in the unmasked zones. The energy may be delivered as ions, as neutral particles, or as radiation. The ions may be small ions with low atom count, such as less than about 10 atoms each, for example molecular ions, or the ions may be large ions having about 10 atoms each or more, for example macromolecular ions or cluster ions. The neutral particles may be neutralized species of any of the types of ions described above, or may be radical species. The radiation may be laser or electron beam radiation. The energy type and mode of delivery is generally selected to penetrate the resist and protective layer in the unmasked areas of the substrate while not penetrating the resist and protective layer in the masked areas. As described above, dopants may be included in the protective layer to adjust the energy penetrating properties of the protective layer. Depending on thickness and density of the patterned resist layer thick and thin portions and the protective layer, energetic species having average kinetic energy between about 100 eV and about 10 keV may be used to modify a magnetic property of the substrate.

At 108, a magnetic property of selected regions of the magnetically active layer, as defined by the unmasked portions thereof resulting from the pattern of the resist layer, is modified by the directed energy. The energetic species penetrate into the magnetically active layer in the unmasked portions, disrupting alignment of atomic and/or molecular magnetic moments to change magnetic coercivity, susceptibility, or other magnetic properties in the unmasked portions. In some embodiments, the magnetically susceptible layer is demagnetized in the unmasked portions, resulting in no detectable residual magnetic field in the unmasked portions. In other embodiments, magnetization is reduced between about 50% and about 95%.

At 110, the protective layer and patterned resist layer are removed. Any process that removes the layers without altering or damaging the magnetic pattern formed in the magnetically susceptible layer may be used. In one instance, a fluorine-containing plasma may be used to strip the protective layer and the patterned resist in a single operation. Materials such as $CF_4$, $BF_3$, and $SiF_4$, are provided to a plasma chamber containing the substrate, along with an oxidizing gas such as $O_2$, $O_3$, $NO_3$, CO, or $H_2O$, and a reducing gas such as $H_2$ or $NH_3$. The gases may be activated remotely or in situ by applying dissociate energy such as RF energy to the gases. In one embodiment, RF energy is coupled into the gas mixture using an inductive plasma source. The fluorine-containing oxidizing/reducing mixture thus generated etches the silicon-containing protective layer and the patterned resist layer without etching the magnetically susceptible layer.

Figure 2A:
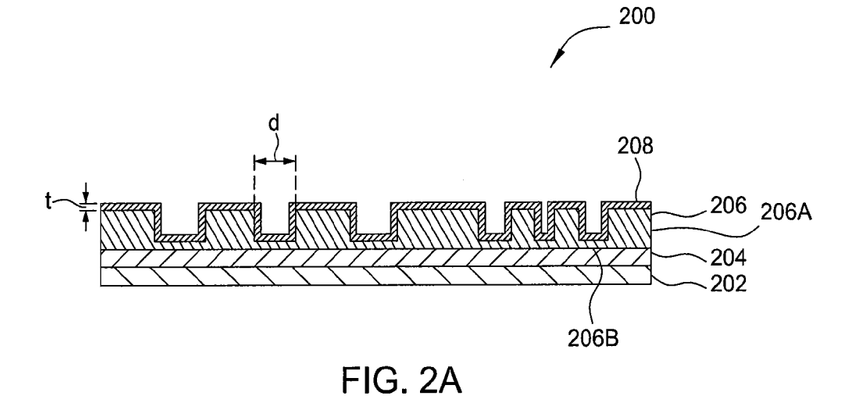
FIG. 2A is a schematic side view of a device according to another embodiment.

FIG. 2A is a schematic side view of a device 200 according to another embodiment. The device 200 is a magnetic media device at an intermediate stage of processing, and may be formed using any of the embodiments described herein. The device 200 has a magnetically susceptible layer 204 formed on a structural substrate 202. The magnetically susceptible layer 204 and the structural substrate 202 may comprise any of the materials or descriptions of such layers included herein. A patterned resist layer 206 having thick coverage portions 206A and thin coverage portions 206B is formed in contact with the magnetically susceptible layer 204. The pattern may be formed by any suitable process, including physical and lithographic patterning techniques, as described herein. The pattern has a pitch "d" corresponding to a minimum dimension of a thick or thin coverage region of the patterned resist. A conformal protective layer 208 is formed over the patterned resist layer 206 by processes described herein. The conformal protective layer 208 has a thickness "t" that is no more than 25% of the pattern pitch "d". In some embodiments, the thickness "t" of the conformal protective layer 208 is between about 1% and about 25% of the pattern pitch "d", such as between about 5% and about 20%, for example about 15%. The thickness "t" being less than about 25% of the pattern pitch "d" preserves the function of the pattern, allowing energetic species to impact the magnetically susceptible layer 204 in areas covered by the thin coverage portions 206B and blocking the energetic species in areas covered by the thick coverage portions 206A.

Figure 2B:
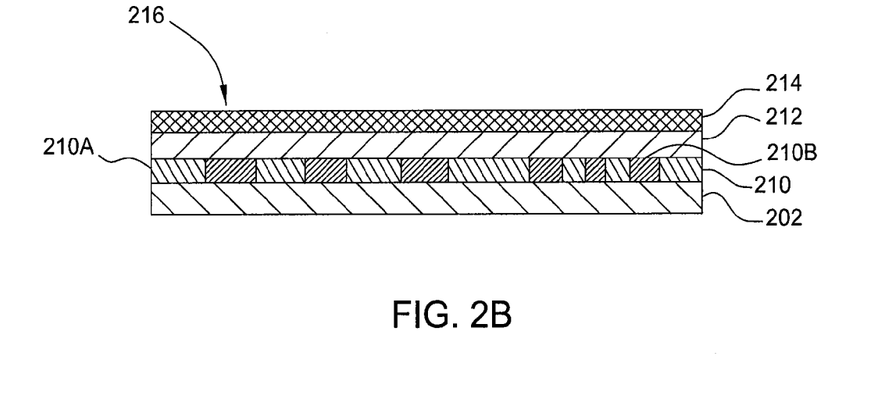
FIG. 2B is a schematic side view of a device according to another embodiment.

FIG. 2B is a schematic side view of a device 216 according to another embodiment. The device 216 is a magnetic media device that may be formed using the processes described herein, and which may be prepared from the intermediate stage device 200 of FIG. 2A. The device 216 comprises the structural substrate 202 as in the device 200 of FIG. 2A. A patterned magnetically susceptible layer 210 contacts the structural substrate 202, and comprises a pattern of magnetic properties. A first domain 210A of the magnetically susceptible layer 210 has a magnetic property with a first value, and a second domain 210B of the magnetically susceptible layer 210 has a second value of the magnetic property, detectably different from the first value by statistically significant measurement. The first domain 210A may also be implanted with dopants such as boron, fluorine, silicon, carbon, nitrogen, oxygen, and the like, while the second domain 210B may be substantially free of such dopants. The first domain 210A may be doped with any of the aforementioned dopants to a concentration between about $10^{16}$ and about $10^{22}$ atoms/cm$^3$.

A contact prevention layer 212 is formed over the patterned magnetically susceptible layer 210 to prevent the patterned magnetically susceptible layer 210 from contacting any operating equipment during read/write operations, and a lubricating layer 214 is formed over the contact prevention layer 212 to protect the read/write head from damage in the event of contact with the device 216. The contact prevention layer is typically deposited but may be formed by a coating method in some embodiments. The contact prevention layer is generally magnetically inactive, and may be a carbon containing layer, such as amorphous carbon, diamond-like carbon, or carbon nitride, in some embodiments. The lubricating layer may be a lubricious polymer, such as a fluoropolymer, and may be formed by any convenient method such as deposition or coating.

It should be noted that the device 216 may be made by subjecting the device 200 of FIG. 2A to energetic species selected to penetrate the thin coverage portions 206B of the patterned resist layer 206 while not penetrating the thick coverage portions 206A, thus changing a magnetic property of the magnetically susceptible layer 204 covered by the thin coverage portions 206B, removing the patterned resist layer 206 and the conformal protective layer 208, and adding the contact prevention and lubrication layers 212 and 214 of FIG. 2B.

Figure 2C:
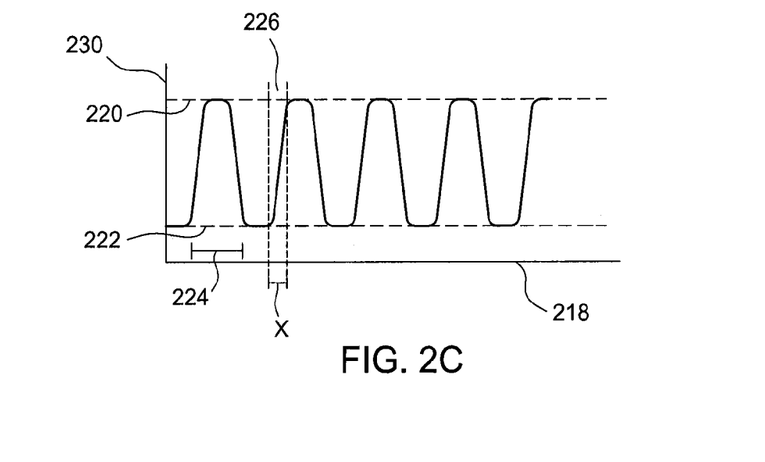
FIG. 2C is a graph illustrating a magnetic property of the device of FIG. 2B

FIG. 2C is a graph illustrating a magnetic property of the magnetically susceptible layer 210 in the device 216 of FIG. 2B. The axis 230 shows the value of a magnetic property, for example residual magnetism or magnetic coercivity. The axis 218 denotes a physical dimension parallel to the plane defined by the magnetically susceptible layer 210. The value of the magnetic property varies from a first value 220 to a second value 222 across the magnetically susceptible layer 210 according to the domains 210A and 210B formed by the energy treatment described above in connection with FIG. 1 or below in connection with FIG. 3. The distance 224 approximately coincides with a dimension of a domain such as the domains 210A and 210B.

The value of the magnetic property transitions from the first value 220 to the second value 222, or vice versa, in a transition region "x" that forms the interface between two magnetic domains. A detector detecting the magnetic property in the transition region "x" would detect a value for the magnetic property that is different from the first value 220 and the second value 222 by a statistically significant amount. The dimension 226 of the transition region "x" determines the maximum storage density of the substrate. If the dimension 226 is small, contrast between the magnetic domains is sharp and easily detected, which allows smaller domains. Because the conformal protective layer or stabilization layer formed over the patterned resist reduces pattern degradation during energy processing, devices made according to embodiments described herein may have transition regions between domains that have dimension less than about 2 nm, such as less than about 1 nm, for example between about 3 Å and about 8 Å.

Figure 3:
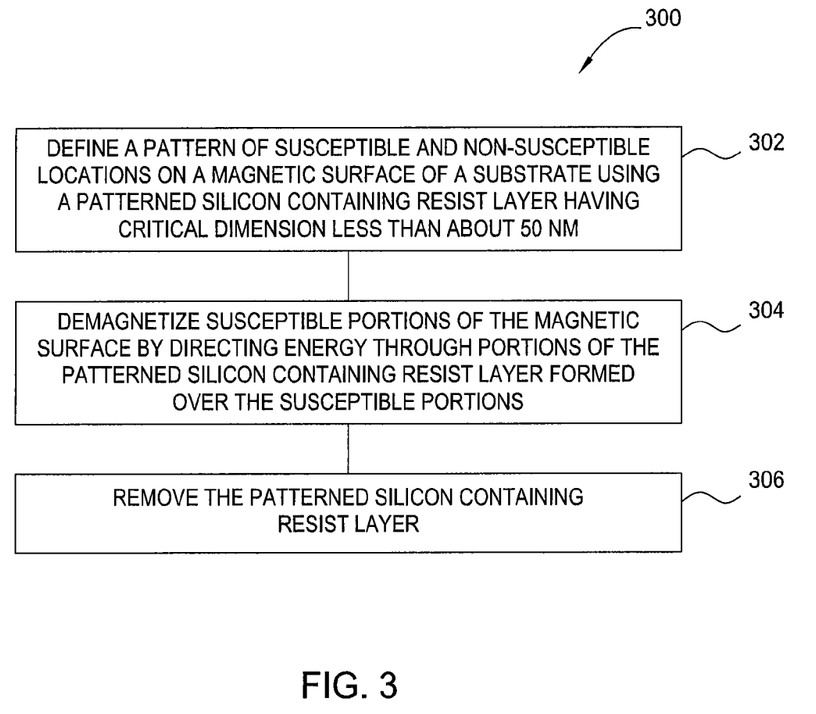
FIG. 3 is a flow diagram summarizing a method according to another embodiment.

FIG. 3 is a flow diagram summarizing a method 300 according to another embodiment. At 302, a pattern of susceptible and non-susceptible locations is formed on a magnetic substrate using a patterned silicon-containing resist layer having a critical dimension less than about 50 nm, such as between about 1 nm and about 50 nm, or between about 5 nm and about 15 nm, for example about 10 nm. The magnetic substrate may be formed by depositing a magnetic layer over a structural substrate, forming a patterned resist layer having thick coverage portions and thin coverage portions on the magnetic layer, and forming a conformal protective layer on the patterned resist layer using any of the processes described herein.

At 304 energy is directed through portions of the patterned silicon-containing resist layer, using processes described herein, to demagnetize portions of the magnetic layer according to the pattern formed in the patterned silicon-containing resist layer. The energy penetrates the patterned silicon-containing resist layer in the thin coverage portions without penetrating in the thick coverage portions, demagnetizing the areas of the magnetic layer covered by the thin coverage portions, and creating a pattern of magnetic properties in the magnetic layer. The topography of the magnetic layer is substantially unchanged by the patterning process.

At 306, the patterned silicon-containing resist layer is removed using a process that does not damage or alter the pattern of magnetic properties. The plasma process described above involving a fluorine chemistry may be used to remove the patterned silicon-containing resist layer.

Figure 4:
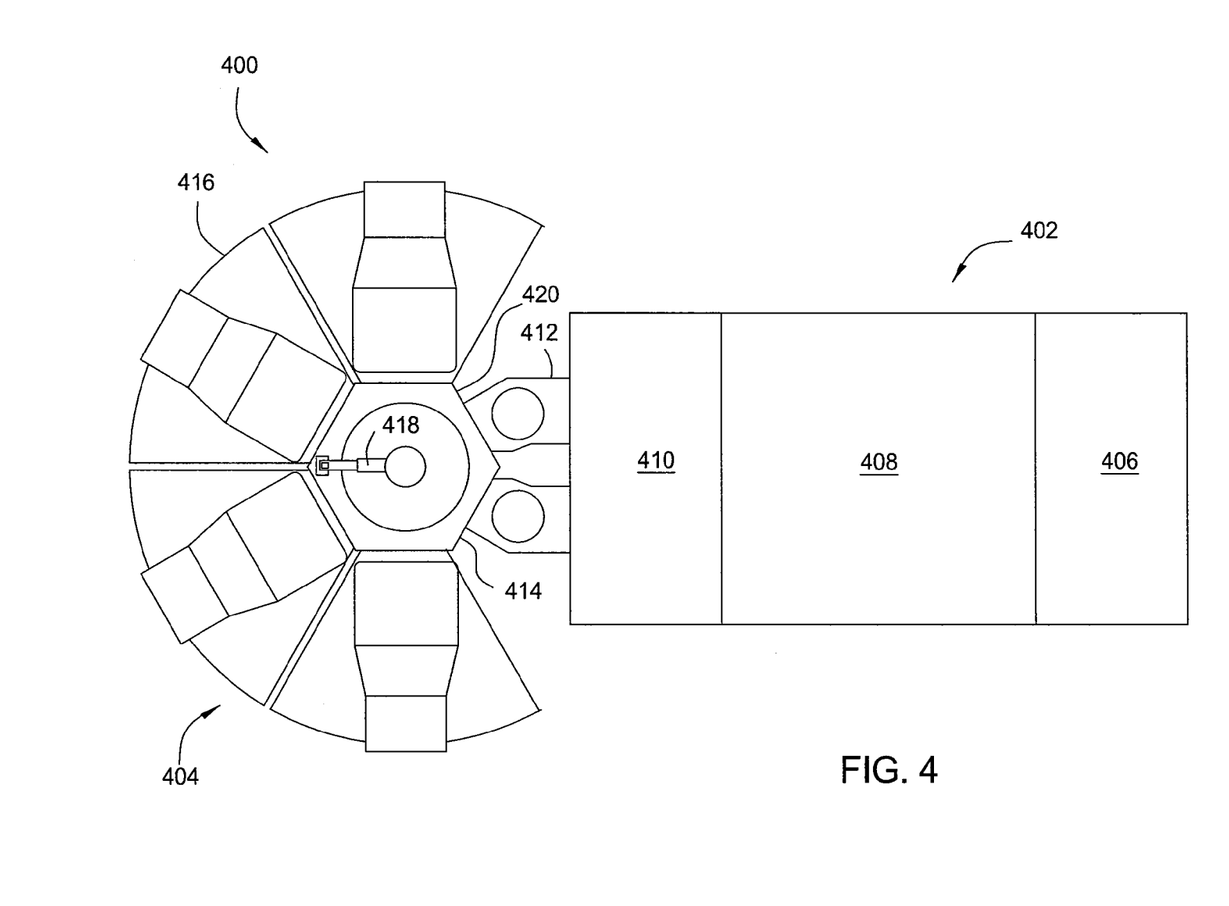
FIG. 4 is a plan view of an apparatus according to another embodiment.

FIG. 4 is a schematic plan view of an apparatus 400 that may be used to perform embodiments described herein. The apparatus 400 comprises a substrate handling portion 402 and a substrate processing portion 404. The substrate handling portion 402 comprises a loading station 406, a transfer station 408, and an interface station 410. Substrates are loaded into the apparatus 400 at the loading station 406. In some cases, the loading operation may comprise disposing one or more substrates on a carrier for transport through the apparatus 400. The transfer station 408 moves substrates from the loading station 406 to the interface station 410. The transfer station 408 may comprise substrate handling features, such as flippers, if desired. The interface station 408 provides substrates to an entry load-lock chamber 412 for entry to the substrate processing portion 404, which generally operates under vacuum. The substrate processing portion 404 comprises a plurality of substrate processing chambers 416 coupled to a transfer chamber 420 with a transfer robot 418 disposed therein. Each of the processing chambers 416 may be a CVD chamber, an ALD chamber, a PVD chamber, a PECVD chamber, a PEALD chamber, a plasma cleaning chamber, a cool-down chamber, or a plasma immersion chamber. In one embodiment, each of the chambers 416 is a plasma immersion chamber configured to form a conformal protective layer over a magnetic substrate having a patterned resist layer formed thereon, subject the substrate to energy to penetrate portions of the patterned resist and form a pattern of magnetic properties on the substrate, and remove the conformal protective layer and patterned resist layer, all in a single chamber. In other embodiments, functions of the chambers 416 may be divided such that one chamber, such as a PEALD chamber, forms a conformal protective layer, another chamber, such as a plasma immersion chamber, performs an energy treatment, and another chamber, such as a plasma immersion chamber, performs resist and protective layer removal. An exit load-lock chamber 414 receives processed substrates for transfer back to the substrate handling portion 402.

While the foregoing is directed to embodiments of the invention, other and further embodiments of the invention may be devised without departing from the basic scope thereof.

What is claimed is:

1. A substrate having a magnetically susceptible layer, the magnetically susceptible layer comprising:
    a first plurality of domains formed on the substrate and having a magnetic property with a first value;
    a second plurality of domains formed on the substrate and having a second value of the magnetic property; and
    a transition region formed on the substrate between the first plurality of domains and the second plurality of domains, the transition region having a width between about 3 Å and about 8 Å, wherein each of the first plurality of domains and the second plurality of domains has a width less than about 25 nm.

2. The substrate of claim 1, wherein the first plurality of domains is doped with boron, flourine, silicon, carbon, nitrogen or oxygen.

3. The substrate of claim 2, wherein the second plurality of domains is substantially free of dopants.

4. The substrate of claim 1, wherein the first plurality of domains is doped with boron.

5. The substrate of claim 4, wherein the first plurality of domains is doped to a concentration between $10^{16}$ and $10^{22}$ atoms/cm$^3$.

6. The substrate of claim 1, wherein the first plurality of domains is doped with silicon.

7. The substrate of claim 1, wherein the first plurality of domains is doped with carbon.

8. The substrate of claim 1, further comprising:
    a contact prevention layer formed on the magnetically susceptible layer.

9. The substrate of claim 8, further comprising:
    a lubricating layer formed on the contact prevention layer.

* * * * *